United States Patent [19]
Tanaka

[11] Patent Number: 5,738,883
[45] Date of Patent: Apr. 14, 1998

[54] INJECTION MOLDING CASSETTE MOLD HOLDER

[75] Inventor: Yoshihiko Tanaka, Nagano-ken, Japan

[73] Assignee: Shinsei Corporation, Nagano-ken, Japan

[21] Appl. No.: 321,083

[22] Filed: Oct. 11, 1994

[30] Foreign Application Priority Data

Mar. 16, 1994 [JP] Japan ................................. 6-072753

[51] Int. Cl.$^6$ ................................................. B29C 45/36
[52] U.S. Cl. .................................. 425/190; 425/192 R
[58] Field of Search ................................ 425/589, 190, 425/192 R

[56] References Cited

U.S. PATENT DOCUMENTS

| | | | |
|---|---|---|---|
| 4,923,388 | 5/1990 | Nakamura | 425/577 |
| 5,114,329 | 5/1992 | Nakamura et al. | 425/190 |

*Primary Examiner*—Thomas R. Weber
*Attorney, Agent, or Firm*—Burns, Doane, Mathis & Swecker LLP

[57] ABSTRACT

A cassette mold holder (7) has a cassette mold insertion portion (12) into which a cassette mold (14) is inserted from above. The insertion portion (12) is inclined with respect to a vertical line (VL) by about 6° when the holder (7) is attached to an injection molding machine. An insertion port (121) of the insertion portion (12) is large, and the inside surfaces (12b, 12c) adjacent to the insertion port have tapered surfaces (12d, 12e) respectively to guide the cassette mold into the insertion hollow portion. Since the insertion portion (12) is inclined, when the cassette mold (14) is inserted, one of the inside surfaces (12b) and the bottom (122) function as reference surfaces to position the cassette mold automatically. Further, the cassette mold (14) can be inserted easily along the tapered surfaces (12d, 12e).

8 Claims, 7 Drawing Sheets

INJECTION MOLDING CASSETTE MOLD HOLDER

BACKGROUND OF THE INVENTION

1. Field of the Invention

The present invention relates to an injection molding cassette mold holder, and more particularly to an injection molding cassette mold holder into which a cassette mold can easily be inserted.

2. Related Art Statement

An injection molding machine produces a molded item of a desired shape by attaching a cavity and a core to a fixed plate and a movable platen respectively of its clamp unit to clamp and by injecting a molding material such as thermoplastic resin between the cavity and the core.

Accordingly, in order to produce molded items of different shapes, it is necessary to change molds. When the volume of production is relatively low and there are a wide variety of products to be made, it is necessary to change molds frequently, which lowers production efficiency. Thus, a cassette mold is sometimes used for carrying out such a change efficiently. When a cassette mold is used, a mold can be attached only by inserting a cassette mold corresponding to a molded item into a cassette mold holder attached to a fixed plate and a movable platen respectively of a clamp unit of an injection molding machine.

A cassette mold commonly used has a fixed plate side holder part to be mounted on a fixed plate, and a movable platen side holder part to be mounted on a movable platen. Each of the parting surfaces of these holder parts has a recess, and when these holder parts are closed, a cassette mold insertion portion is formed between the closed holder parts. The attachment of the mold is completed by inserting the cassette mold into the cassette mold insertion portion and by positioning and fixing the mold with fixing pins and so on.

Conventionally, the cassette mold insertion portion is formed vertically or horizontally, so that the cassette mold is inserted into the cassette mold insertion portion vertically from right above or laterally from just beside positioning the cassette mold. After the insertion, the cassette mold is fixed so that a gate of the cassette mold may be properly positioned at a sprue on the clamp unit side. When the cassette mold is inserted from just beside, the cassette mold is locked with fixing pins and the like lest the cassette mold fall off.

As is seen from the above description, conventionally it has been necessary to insert the cassette mold accurately aligning the cassette mold. Furthermore, after the insertion, it has been required to fix the cassette mold at a proper position with fixing pins or the like.

An object of the present invention is to provide an injection molding cassette mold holder into which a cassette mold can be inserted much more easily than into a conventional cassette mold holder.

SUMMARY OF THE INVENTION

In order to achieve the above and other objects, in an injection molding cassette mold holder according to the present invention, by making a cassette mold insertion portion formed in the holder inclined with respect to a vertical line or a horizontal line by a certain angle, the insertion operation of a cassette mold can be performed easily.

More specifically, in one aspect of the present invention, there is provided an injection molding cassette mold holder having a fixed plate side holder part and a movable platen side holder part to be attached to a fixed plate and a movable platen respectively of a clamp unit of an injection molding machine, a first recess formed on a parting surface of the fixed plate side holder part contacting with the movable platen side holder part, and a second recess formed on a parting surface of the movable platen side holder part contacting with the fixed plate side holder part, wherein by closing these holder parts, a mold insertion portion into which a cassette mold composed of a cavity and a core can be inserted can be formed from the first and second recesses between these holder parts, characterized in that the mold insertion portion of the cassette mold holder comprises a cassette mold insertion port formed on top of a pair of holder parts when the holder parts are closed, a mold insertion hollow portion extending from this insertion port in a direction inclined to a vertical line by a predetermined angle, and a mold insertion bottom defining the lower end of the mold insertion hollow portion. The mold insertion hollow portion is usually inclined by an angle in the range of about 3° to 10° with respect to a vertical line.

By inclining the mold insertion portion, it is possible to use one of its inside wall surfaces and the bottom as reference surfaces to position the cassette mold. Accordingly, these two surfaces automatically perform the positioning of the cassette mold when the mold is inserted. Hence the simplification of the insertion operation of the cassette mold.

In practical use, considering such limitations as layout of each portion, it is preferable that the angle of inclination of the mold insertion hollow portion be about 6° to a vertical line.

Because an external shape of the cassette mold is usually rectangular parallelopiped, the mold insertion hollow portion into which the cassette mold is inserted is made to have an approximately rectangular section. In this case, in order to make the insertion of the cassette mold easy to perform, it is preferred to make the mold insertion port larger than the mold insertion hollow portion by forming tapered surfaces which are away from each other toward the mold insertion port on a pair of opposite inside walls adjacent to the mold insertion port. This makes the insertion of the cassette mold from the mold insertion port easy to carry out with the tapered surfaces as guiding surfaces.

In another aspect of the present invention, there is provided an injection molding cassette mold holder of the type having a mold insertion portion into which the cassette mold is inserted laterally, characterized in that the mold insertion portion is inclined downward from the insertion port side by a predetermined angle with respect to a horizontal line. The mold insertion portion is inclined by an angle in the range of about 3° to 10° with respect to a horizontal line.

In this arrangement, too, it is possible to use one of the inside walls of the mold insertion portion and the bottom as reference surfaces for positioning the cassette mold. Further, there is no possibility that the cassette mold inserted into the mold insertion portion fall off even if fixing pins or the like are not used.

In practical use, it is also preferable in this case that the angle of inclination of the mold insertion portion be about 6° to a horizontal line. It becomes easy to insert the cassette mold by making the mold insertion port large and by forming a tapered surface on the inside walls toward the mold insertion space.

The above and other objects and advantages of the present invention will be apparent for those skilled in the art by reading the following description with reference to the attached drawings.

BRIEF DESCRIPTION OF THE DRAWINGS

FIG. 1 shows a conventional horizontal-type injection molding machine to which the cassette mold holder according to the present invention can be attached, wherein

DETAILED DESCRIPTION OF THE PREFERRED EMBODIMENT

Referring now to the attached drawings, an example of the present invention will be described.

Figure 1A:
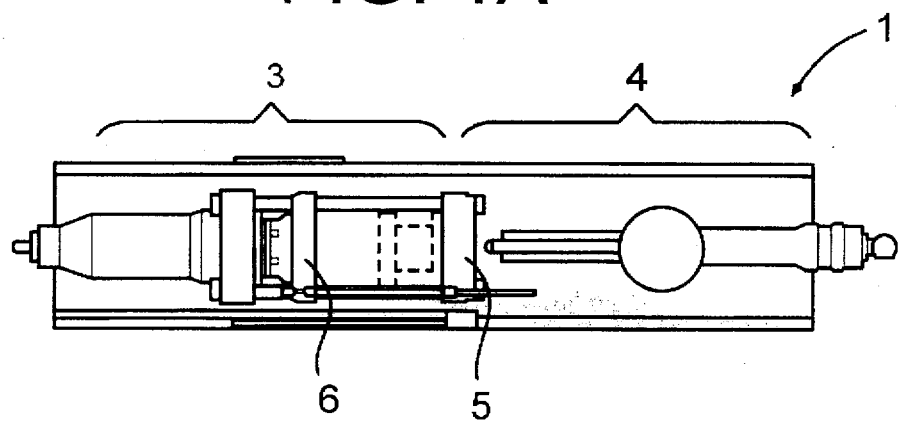
FIGS. 1(A), 1(B) and 1(C) are a top view, a side view and a enlarged partial view to illustrate the fixed plate and the movable platen of the clamp unit, respectively.
Figure 1B:
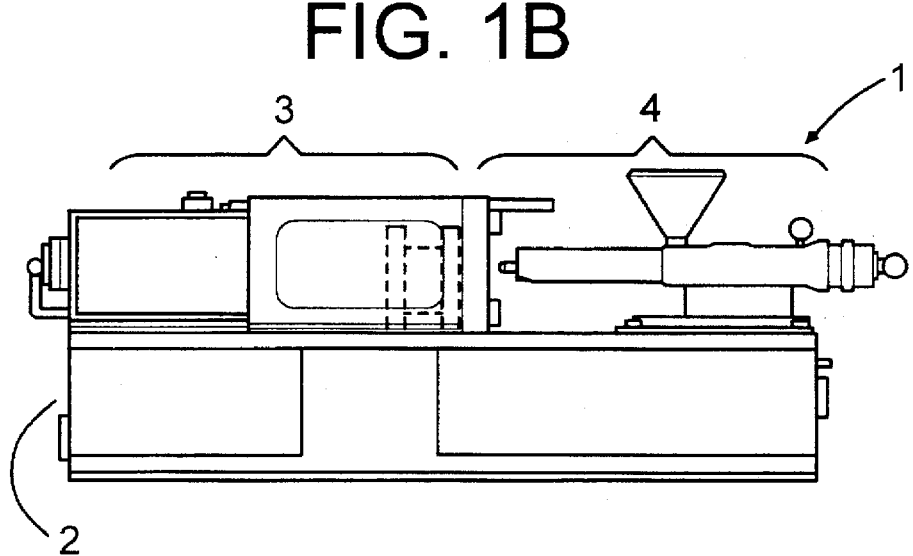
Figure 1C:
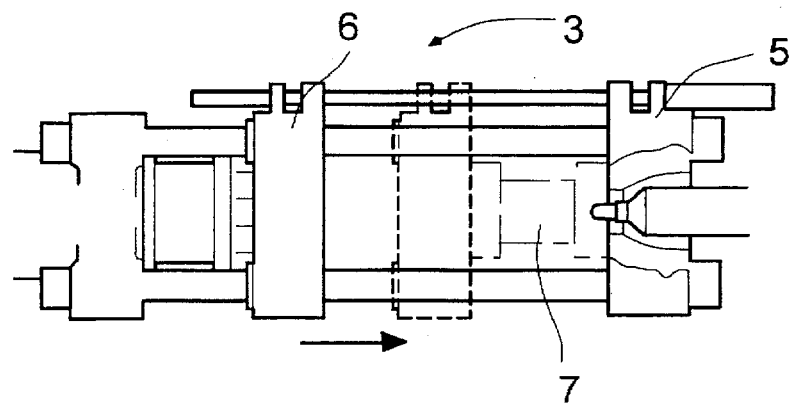

FIG. 1 shows an overall structure of a conventional horizontal-type injection molding machine into which a cassette mold holder according to the present invention can be inserted. An injection molding machine 1 is basically composed of a clamp unit 3 and an injection unit 4 on a base 2, and a driving control unit for hydraulic and electrical systems (not illustrated) inside the base 2. The clamp unit 3 to which a mold is attached has a fixed plate 5 and a movable platen 6 opposite the fixed plate 5, and the movable platen 6 can be moved toward the fixed plate 5 by a mold transfer cylinder. A cassette mold holder 7 in this example is mounted and fixed on the fixed plate 5 and the movable platen 6.

Figure 2:
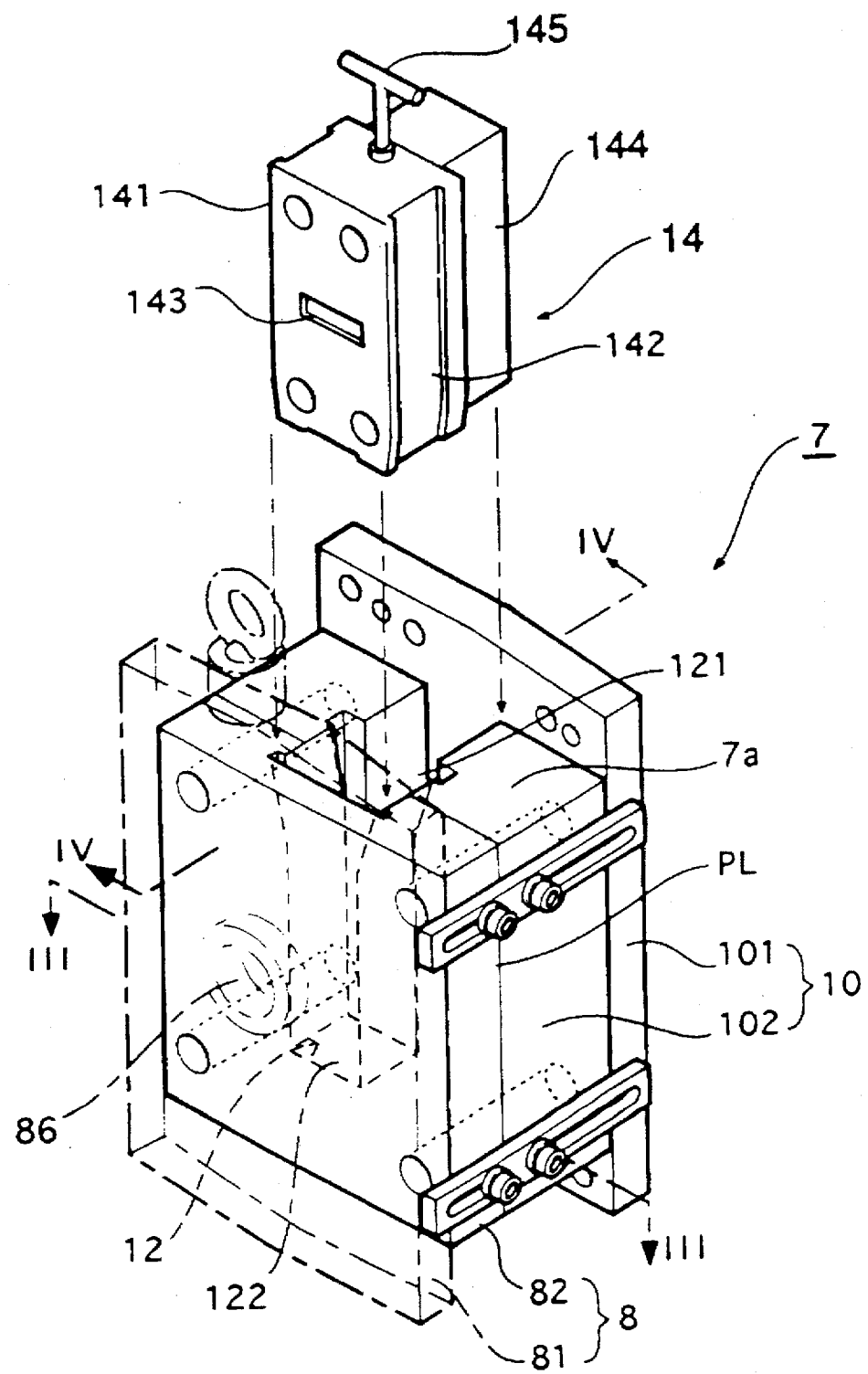
FIG. 2 is a schematic perspective view of an example of the cassette mold holder according to the present invention.
Figure 3:
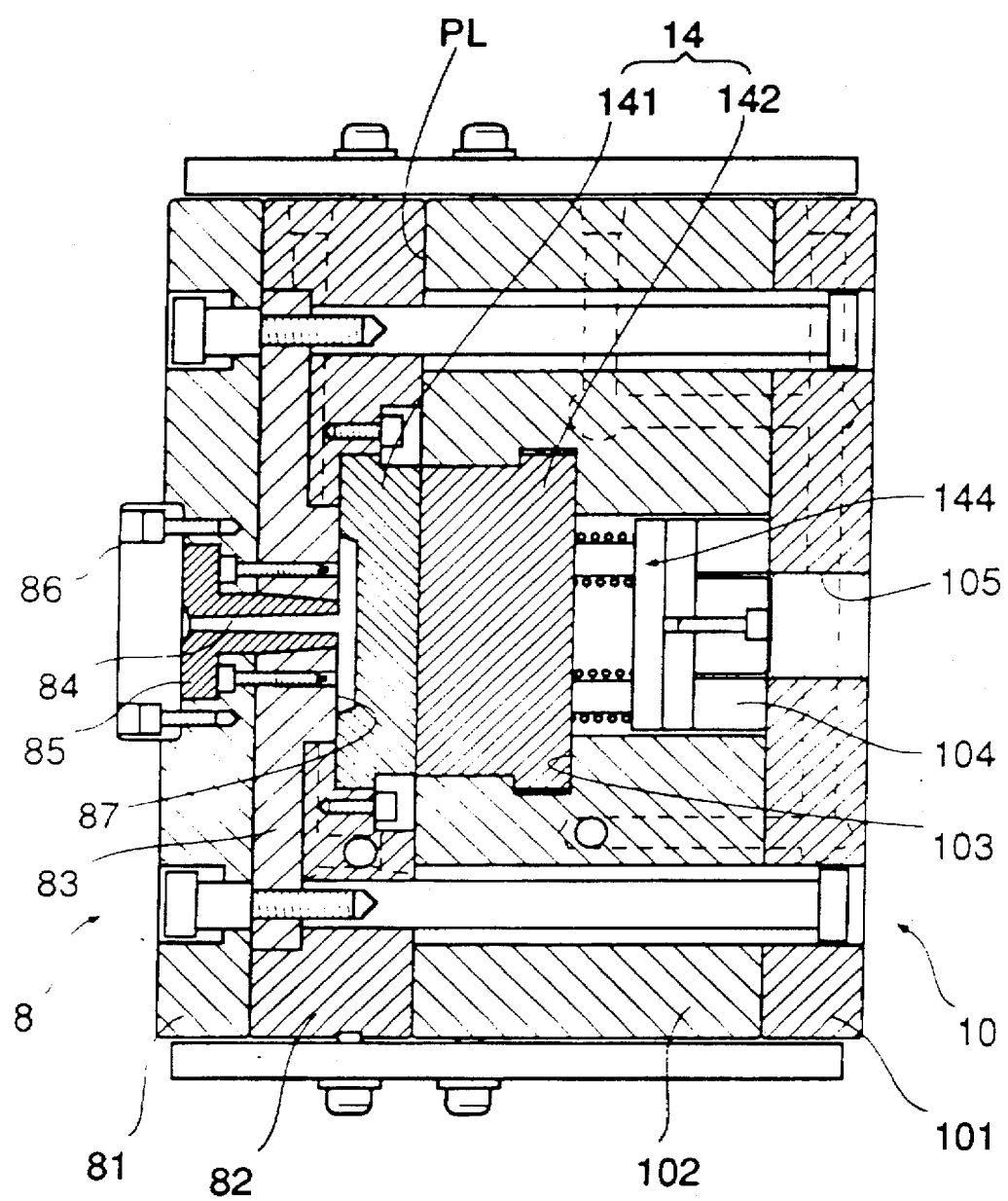
FIG. 3 is a schematic cross sectional view of the holder in FIG. 2 taken along line III—III.
Figure 4:
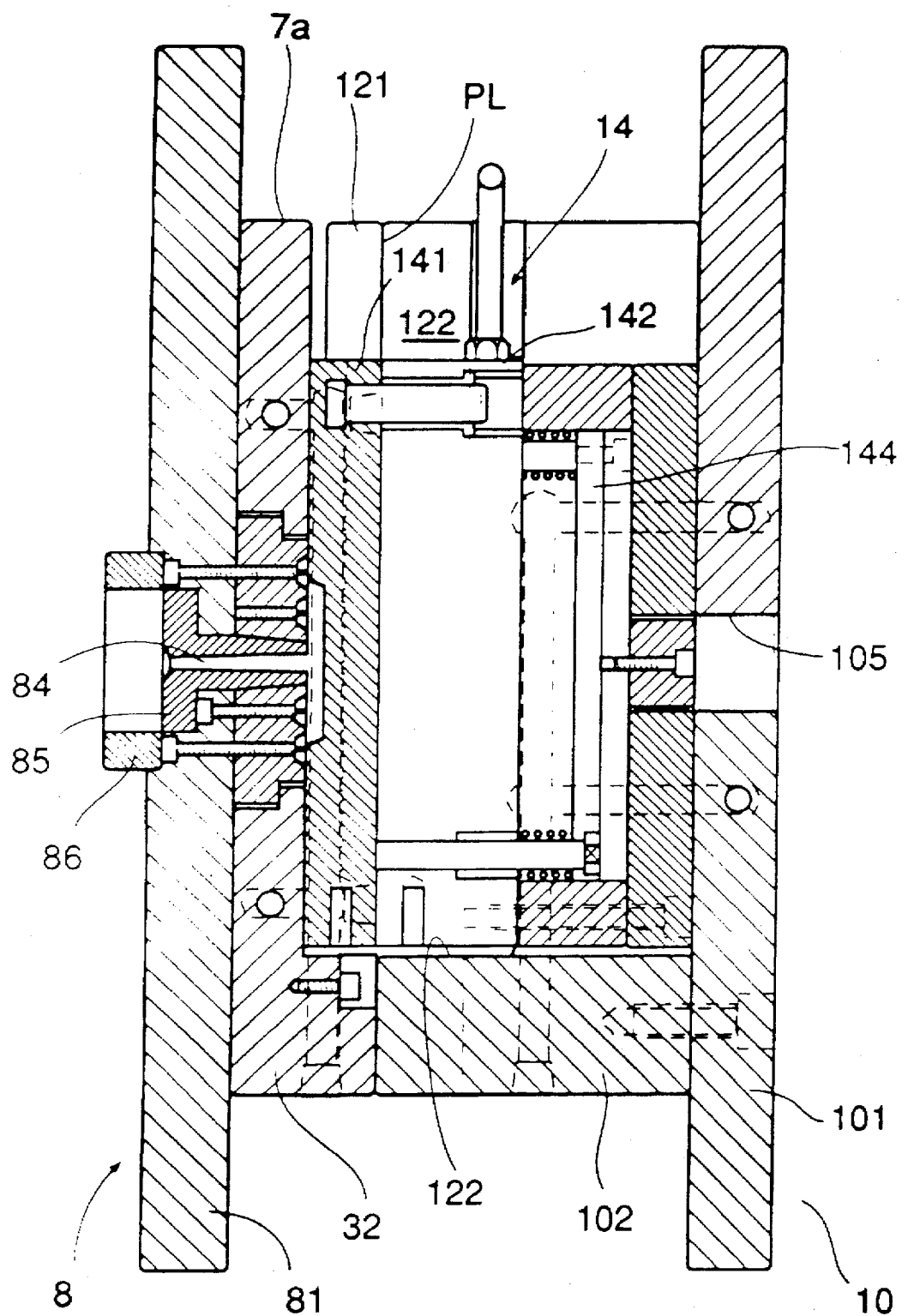
FIG. 4 is a schematic longitudinal sectional view of the holder of FIG. 2 taken along line IV—IV.

FIG. 2 shows the cassette mold holder 7 of the example. FIG. 3 and FIG. 4 illustrate a cross section and a vertical section of the holder 7, respectively. As shown in these drawings, the cassette mold holder 7 comprises a fixed plate side holder part 8 to be fixed on the fixed plate 5 side, and a movable platen side holder part 10 to be fixed on the movable platen 6 side. The fixed plate side holder part 8 has a mounting plate 81 for mounting thereof on the fixed plate 5, and a main plate 82 of the fixed plate side holder part mounted on the mounting plate 81, and between these plates is a runner plate 83. In the center of the outside of the mounting plate 81, a sprue bush 85 in which a sprue 82 is formed is attached, and the bush is fixed with a locating ring 86. The main plate 82 of the fixed plate side holder part has a first recess 87 of an approximately rectangular section, and on the side surface of the recess 87, an opening end of the sprue 84 is exposed.

The movable platen side holder part 10 comprises a mounting plate 101 for mounting thereof on the movable platen 6, and a main plate 102 of the movable platen side holder part mounted on the inside of the mounting plate 101. In the center of the main plate 102 of the movable platen side holder part is a second recess 103 of an approximately rectangular section, and on the side surface forming the bottom of the recess 103 is a recess 104 of a narrow rectangular section adjacent to the recess 103. A hole 105 in the mounting plate 101 is positioned to face the center of the recess 104, and is for an ejector rod (not illustrated) on the injection molding machine 1 side to pass through.

The fixed plate side holder part 8 and the movable platen side holder part 10 are fixed on the fixed plate 5 and the movable platen 6 respectively with such fastening fitments as bolts and clamped. This clamped condition is illustrated in the drawings. In the clamped condition, the recesses 87, 103 and 104 formed on both sides define a cassette mold insertion portion 12 into which a cassette mold 14 is inserted. As shown in FIG. 2, the cassette mold insertion portion 12 of the example has an insertion port 121 on the top surface 7a of the holder 7. Insertion hollow portion adjacent to the insertion port 121 has a closed bottom 122.

Figure 5A:
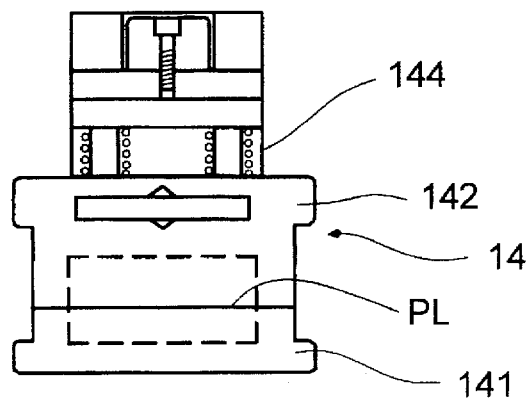
FIG. 5 shows the cassette mold of FIG. 2, wherein 5(A), 5(B) and 5(C) are a top view, a side view and a longitudinal sectional view, respectively.
Figure 5B:
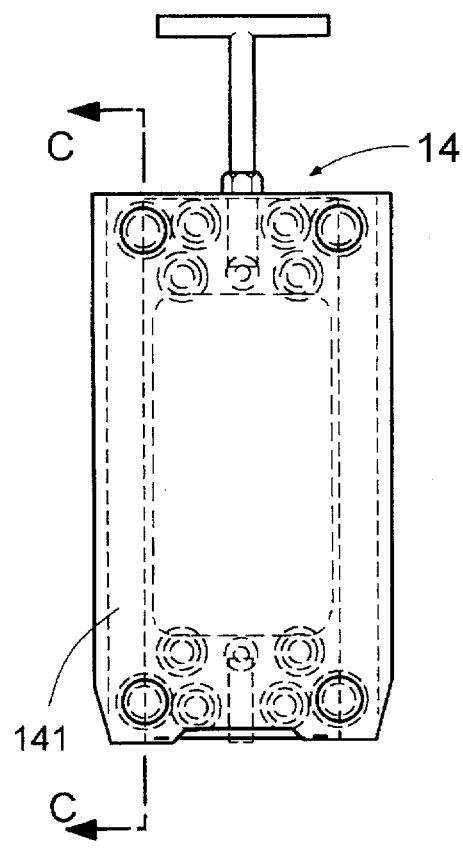
Figure 5C:
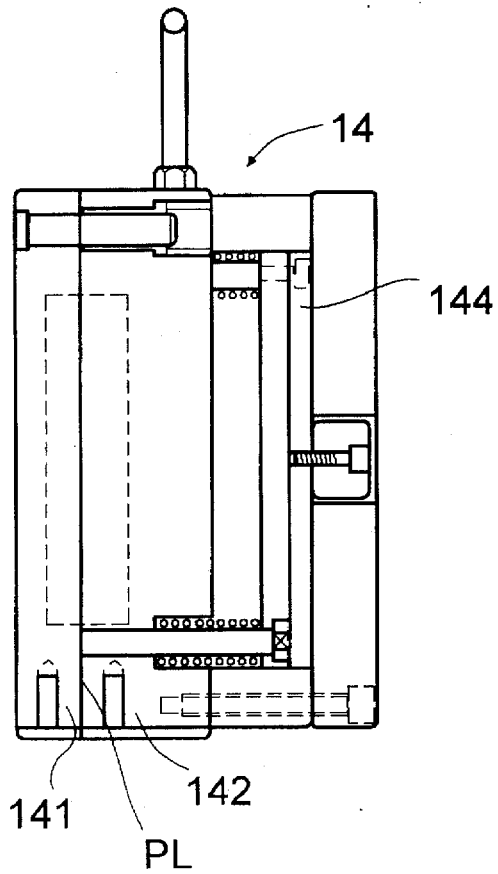

The cassette mold 14 of the example, as shown in FIGS. 2 and 5, comprises a cavity 141 on the side of the fixed plate side holder part 8 and a core 142 on the other side. The cavity 141 and the core 142 are clamped beforehand. On the outside of the cavity 141 is a gate portion 143. While on the outside of the core 142, an ejector-pin mechanism 144 is attached. In addition, on the top surface of the core 142, a handgrip 145 is attached which is used in inserting the mold into or removing it from the mold insertion portion. The cassette mold 14 can be inserted into or removed from the insertion portion 12 from above the holder 7.

Figure 6:
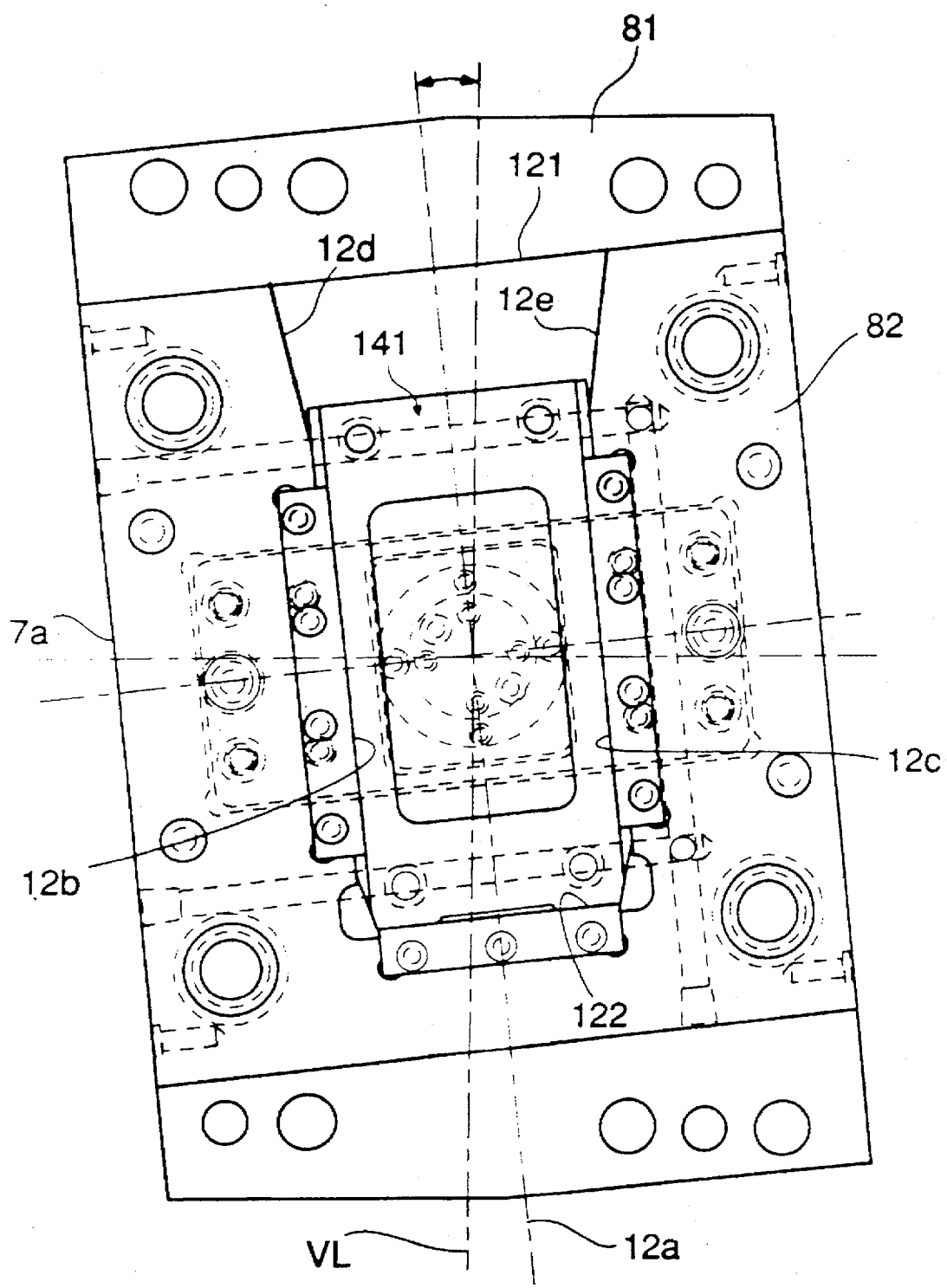
FIG. 6 shows the cavity viewed from the core side when the holder of FIG. 2 is divided along the parting line.
Figure 7:
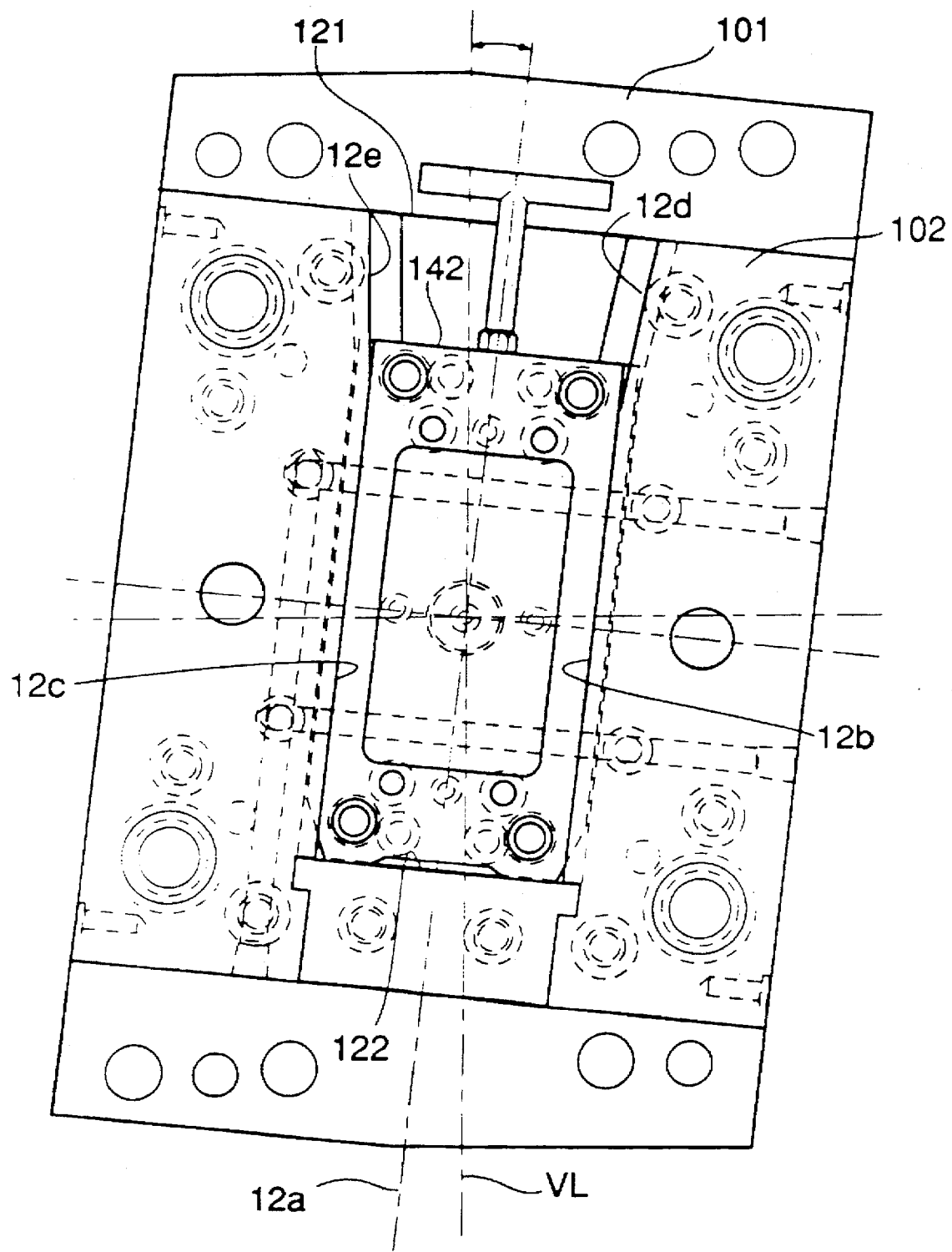
FIG. 7 shows the core viewed from the cavity side when the holder in FIG. 2 is divided along the parting line.

The constitution of the cassette mold insertion portion 12 in this example will be described in detail with reference to FIGS. 6 and 7. FIG. 6 shows the surface of the cavity viewed from the core side when the cassette mold is divided along its parting line PL with the cassette mold inserted, while FIG. 7 shows the surface of the core viewed from the cavity side in the same condition. As shown in these drawings, the upper end of the mold insertion portion 12 of the example is an insertion port 121 while its lower end is a bottom 122. Insertion space between the insertion port 121 and the bottom 122 extends in a direction inclined toward one side by about 6° with respect to a vertical line VL. In other words, a center line 12a of the mold insertion space is inclined by about 6° to the vertical line VL. In this example, in order to make the holder easy to produce, the mold insertion portion 12 is formed parallel to a holder side 7a, and the holder 7 can be fixed on the side of the fixed plate 5 and the movable platen 6 of the injection molding machine 1 with the holder 7 inclined by about 6°. Anyway, when the holder 7 in this example is mounted on the clamp unit of the injection molding machine 1, its cassette mold insertion portion 12 is made to be inclined by about 6° to the vertical line VL.

Since the mold insertion portion 12 is inclined, one of the inside surfaces 12b and the bottom 122 function as reference surfaces of the cassette mold 14. Accordingly, if these two surfaces are processed to have high accuracy, an alignment of the cassette mold 14 is performed automatically only by inserting it into the insertion portion 12.

In this example, as shown in FIG. 2 or FIGS. 6 and 7, the top surfaces of a pair of inside surfaces 12b and 12c of the mold insertion portion 12 are tapered surfaces 12d and 12e respectively which are tapered in a direction opening right and left, and the upper ends of the tapered surfaces are adjacent and continued to the mold insertion port 121. Therefore, because these tapered surfaces function as guiding surfaces of the cassette mold 14, it is easy to carry out an insertion operation of the cassette mold 14.

As has been explained, the cassette mold holder 7 in this example has the cassette mold insertion portion 12 inclined by 6° to the vertical line when the holder is attached to the injection molding machine 1. Accordingly, only by inserting the cassette mold 14 into this insertion portion 12, the side 12b and the bottom 122 of the insertion portion function as reference surfaces to position the cassette mold automatically. This eliminates the need of conventional operations such as positioning the cassette mold inserted into the insertion portion with fixing pins and others. Hence the easy and rapid insertion operation of the cassette mold can be realized.

In this example, because the cassette mold insertion port is enlarged and the inside surfaces adjacent to the port have the tapered surfaces 12d and 12e to guide the cassette mold, the cassette mold can be inserted easily.

Furthermore, in this example, as can be seen from FIGS. 6 and 7, bottoms 81a and 101a of the mounting plates 81 and 101 on both sides of the holder 7 are angled surfaces instead of being flat ones. This structure has such advantages as being able to prevent the bottoms from rusting by putting the holder on a sleeper and the like to secure air permeability in storing the holder.

Note that although the mold insertion portion is inclined by 6° to the vertical line in this example, it is possible to set the angle of inclination otherwise.

In this example, by fixing the holder 7 inclined to the clamp unit of the molding machine, the cassette mold insertion portion 12 formed inside the holder is inclined to the vertical line. Alternatively, it is possible to form the cassette mold insertion portion 12 inclined inside the holder beforehand, and to attach the holder itself vertically to the molding machine.

The above-mentioned example is one in which the cassette mold is designed to insert into the cassette holder from above. It is also possible to insert the cassette mold into the cassette holder from a lateral direction thereof. In this case, the cassette mold insertion portion is inclined downward from the insertion port toward the bottom by a certain angle with respect to a horizontal line. In this case, too, the insertion portion is generally inclined by about 6°. When the insertion portion is inclined as described above, it is possible to obtain effects similar to those in the before-mentioned example wherein the cassette mold is inserted from above.

As has been described, in the cassette mold holder according to the present invention, the cassette mold insertion portion is attached to the injection molding machine with the cassette mold insertion portion inclined by a certain angle to a vertical line or a horizontal line. Consequently, because one of the inside surfaces and the bottom of the cassette mold insertion portion function as reference surfaces, only by inserting the cassette mold, the cassette mold is positioned automatically. Hence the easy insertion of the cassette mold can be realized. In addition, because the cassette mold insertion portion is inclined, fixing pins and so on to fix the inserted cassette mold become unnecessary.

In the cassette mold insertion portion according to the present invention, since the inside surfaces adjacent to the cassette mold insertion port are tapered surfaces to guide the cassette mold to be inserted, the cassette mold can be inserted easily.

What is claimed is:

1. An injection molding cassette mold holder having a fixed plate side holder part and a movable platen side holder part to be mounted on a fixed plate and a movable platen respectively of a clamp unit of an injection molding machine, a first recess formed on a parting surface of the fixed plate side holder part contacting to the movable platen side holder part, and a second recess formed on a parting surface of the movable platen side holder part contacting to the fixed plate side holder part, in which by closing these holder parts, a mold insertion portion is formed by the first and second recesses between the holder parts for receiving a cassette mold, characterized in that:

said mold insertion portion comprises a cassette mold insertion port formed on top of a pair of holder parts when the holder parts are closed, a mold insertion hollow portion extending downward from the cassette mold insertion port along a direction inclined at an angle of about 3° to 10° with respect to a vertical line, and a mold insertion bottom defining the lower end of the mold insertion hollow portion.

2. An injection molding cassette mold holder according to claim 1, wherein said mold insertion hollow portion is inclined with respect to a vertical line by about 6°.

3. An injection molding cassette mold holder according to claim 1, wherein said mold insertion hollow portion has an approximately rectangular section, a pair of opposite inside walls adjacent to the mold insertion port have tapered surfaces apart from each other toward the mold insertion port, and the mold insertion port is larger than a sectional area of a part of the mold insertion hollow portion adjacent to the mold insertion port.

4. An injection molding cassette mold holder having a fixed plate side holder part and a movable platen side holder part to be mounted on a fixed plate and a movable platen respectively of a clamp unit of an injection molding machine, a first recess formed on a parting surface of the fixed plate side holder part contacting to the movable platen side holder part, and a second recess formed on a parting surface of the movable platen side holder part contacting to the fixed plate side holder part, in which by closing these holder parts, a mold insertion portion is formed by the first and second recesses between the holder parts for receiving a cassette mold, characterized in that:

said mold insertion portion comprises a cassette mold insertion port formed on one of the side surfaces of a pair of holder parts when the holder parts are closed, a mold insertion hollow portion extending from the cassette mold insertion port along a direction inclined downward at an angle of about 3° to 10° with respect to a horizontal line, and a mold insertion bottom defining th lower end of the mold insertion hollow portion.

5. An injection molding cassette mold holder according to claim 4, wherein said mold insertion hollow portion is inclined with respect to a horizontal line by about 6°.

6. An injection molding cassette mold holder according to claim 4, wherein said mold insertion hollow portion has an approximately rectangular section, a pair of opposite inside walls adjacent to the mold insertion port have tapered surfaces apart from each other toward the mold insertion port, and the mold insertion port is larger than a sectional area of a part of the mold insertion hollow portion adjacent to the mold insertion port.

7. An injection molding cassette mold holder according to claim 2, wherein said mold insertion hollow portion has an approximately rectangular section, a pair of opposite inside walls adjacent to the mold insertion port have tapered surfaces apart from each other toward the mold insertion port, and the mold insertion port is larger than a sectional area of a part of the mold insertion hollow portion adjacent to the mold insertion port.

8. An injection molding cassette mold holder according to claim 5, wherein said mold insertion hollow portion has an approximately rectangular section, a pair of opposite inside walls adjacent to the mold insertion port have tapered surfaces apart from each other toward the mold insertion port, and the mold insertion port is larger than a sectional area of a part of the mold insertion hollow portion adjacent to the mold insertion port.

* * * * *